Sept. 22, 1964    J. S. MARTIN    3,149,556
COFFEE MAKING MACHINE
Filed Dec. 18, 1961    5 Sheets-Sheet 1

INVENTOR.
James S. Martin,
BY
Robert R. Lockwood
atty

Sept. 22, 1964

J. S. MARTIN 3,149,556

COFFEE MAKING MACHINE

Filed Dec. 18, 1961

INVENTOR.
James S. Martin,
BY
Robert R. Lockwood
Atty

Sept. 22, 1964                J. S. MARTIN                3,149,556
                            COFFEE MAKING MACHINE
Filed Dec. 18, 1961                                5 Sheets-Sheet 3

INVENTOR.
James S. Martin.
BY
Robert R. Lockwood

Sept. 22, 1964 J. S. MARTIN 3,149,556
COFFEE MAKING MACHINE
Filed Dec. 18, 1961 5 Sheets-Sheet 5

INVENTOR.
James S. Martin,
BY
Robert R. Lockwood
ATTY

United States Patent Office
3,149,556
Patented Sept. 22, 1964

3,149,556
COFFEE MAKING MACHINE
James S. Martin, Springfield, Ill., assignor to Bunn Capitol Company, Springfield, Ill., a corporation of Illinois
Filed Dec. 18, 1961, Ser. No. 159,982
15 Claims. (Cl. 99—291)

This invention relates, generally, to machines for making coffee and it has particular relation to such apparatus for making coffee on a large scale for cafeterias, restaurants, hospitals and the like. It constitutes an improvement over the inventions disclosed in U.S. George R. Bunn Patent Nos. 3,034,417 and 3,034,418, both issued May 15, 1962.

Among the objects of this invention are: To provide upper and lower drawers in a cabinet with ground coffee on a filter in a funnel in the upper drawer to receive hot water sprayed thereover and the lower drawer arranged to receive the coffee extract from the funnel; to apply heat to the coffee extract in the lower drawer in such manner that there is no concentration of heat likely to cause burning of the coffee extract; to heat water in a main hot water tank and to supply a measured amount of hot water to spray over the ground coffee in the upper drawer; to siphon the hot water from the main hot water tank to a cup from which the hot water flows to a spray head overlying the ground coffee in the upper drawer; to employ for a part of the siphon a flexible water line of silicone rubber from the interior of which material deposited thereon from the water can be removed by flexing the water line; to provide a pair of like coplanar upper drawers and a pair of like coplanar lower drawers in the cabinet and for shifting the connection of the water line from the main hot water tank between the upper drawers; to provide a cup individual to each upper drawer and to shift the water line to discharge into either cup; to apply heat to the coffee extract in the lower drawer through a heat transfer liquid; to provide a tea water tank and to fill it from the main hot water tank by employing the same time cycle that is used for making a batch of coffee extract in one of the sets of upper and lower drawers; to provide for selectively raising and lowering the discharge heads depending upon the set of drawers in which a batch of coffee extract is to be brewed; and to shift a single discharge head from one upper drawer to the other depending upon the one selected for brewing a batch of coffee extract.

Other objects of this invention will, in part, be obvious and in part appear hereinafter.

Figure 1:
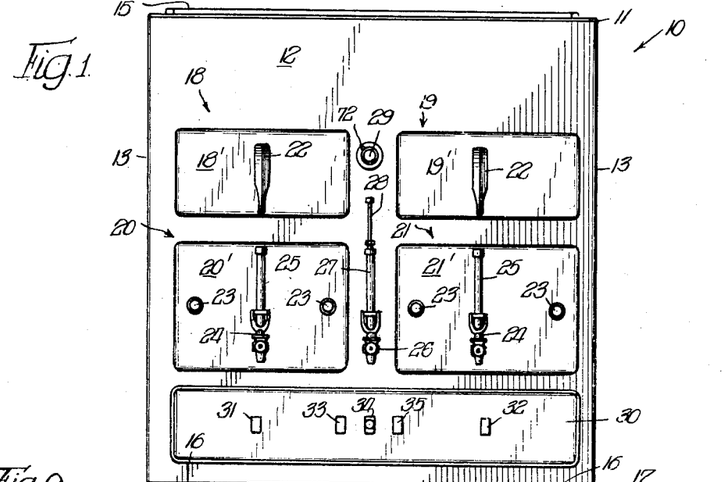
FIG. 1 is a view, in front elevation, of a coffee making machine in which the present invention is embodied.

Referring now particularly to FIG. 1 of the drawings, it will be observed that the reference character 10 designates, generally, a coffee making machine which includes a cabinet 11 that is formed preferably of stainless steel, although other material can be employed as will be understood. The cabinet 11 includes a front 12, side walls 13—13 and a back wall 14, FIG. 2. A removable cover 15 overlies the top. Supports 16—16 serve to mount the cabinet 11 on a counter top 17 or other suitable support.

Mounted for slidable movement into and out of the cabinet 11 through the front wall 12 are left and right coplanar upper drawers 18 and 19 provided, respectively, with front plates 18' and 19' the details of construction of which will be set forth hereinafter. Below the upper drawers 18 and 19 are, respectively, left and right coplanar lower drawers 20 and 21 which are provided, respectively, with front plates 20' and 21'. Handles 22 are provided on the front plates 18' and 19' to facilitate movement of the upper drawers 18 and 19 into and out of the cabinet 11. Latch buttons 23—23 on each of the front plates 20' and 21' serve to hold the lower drawers 20 and 21 in the inserted positions. By operation of the latch buttons 23—23 the lower drawers 20 and 21 are released for movement through a limited extent out of the cabinet 11. Coffee extract faucets 24—24 are provided for the lower drawers 20 and 21 forwardly of the respective front plate 20' and 21' to permit the withdrawal of coffee extract. Sight glasses 25—25 are employed above the coffee extract faucets 24—24 to indicate the level of the coffee extract in the respective lower drawers 20 and 21.

In order to provide hot water for making tea and for other purposes, such as for cleaning the lower drawers 20 and 21, a hot water faucet 26 is mounted on the front wall 12 of the cabinet 11 and it is connected to a suitable supply of hot water to be described. A sight glass 27 associated with the hot water faucet 26 indicates when the level of the hot water has been lowered to a point where the supply should be replenished. Extending upwardly from the sight glass 27 is a vent tube 28 which extends through the front wall 12 and inside the cabinet 11 extends upwardly to a point above the highest level of the hot water which is supplied directly to the hot water faucet 26. For shifting the supply of hot water from one of the upper drawers 18 to the other 19, for example, a control knob 29 is rotatably mounted, in a manner described hereinafter, on the front wall 12 of the cabinet 11.

Near the bottom of the front wall 12 of the cabinet 11 is a control panel 30 that is hinged (not shown) along its lower edge to the front wall 12 to facilitate access to the control system for the coffee making machine 10 that will be described hereinafter. Mounted on and movable with the control panel 30 are an on-off switch 31 for the left coffee extract drawer heater, an on-off switch 32 for the right coffee extract drawer heater, an on-off switch 33 for rendering the timing mechanism operative, an indicating lamp 34 to show that the timing mechanism is in condition for operation, and a start switch 35 to initiate the operation of the timing cycle.

Figures 1A, 9:
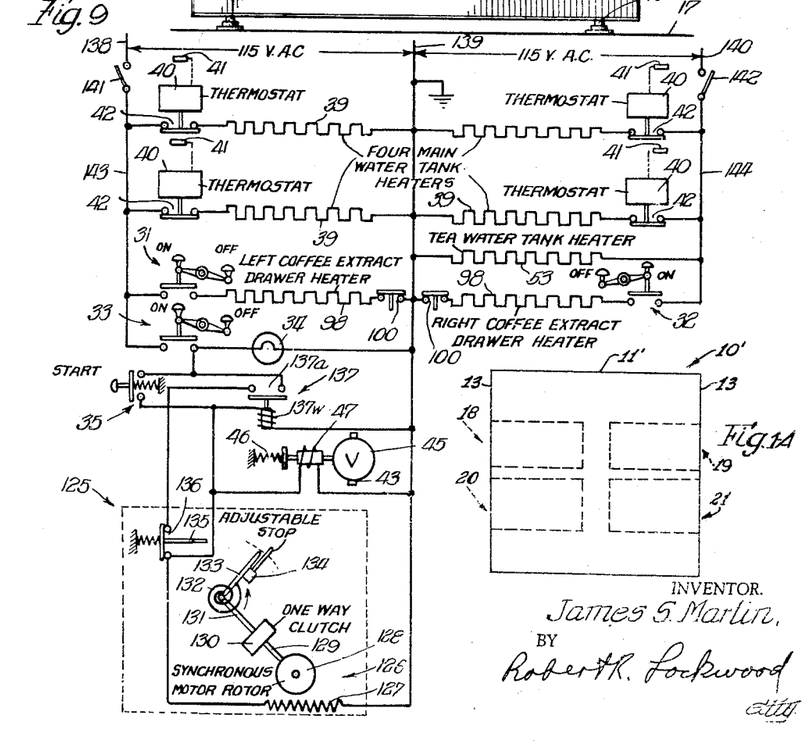
FIG. 1A shows, diagrammatically, an alternate arrangement for mounting the drawers in the cabinet.
FIG. 9 shows diagrammatically the circuit connections that can be employed for the coffee making machine shown in the preceding figures of the drawings.
Figure 2:
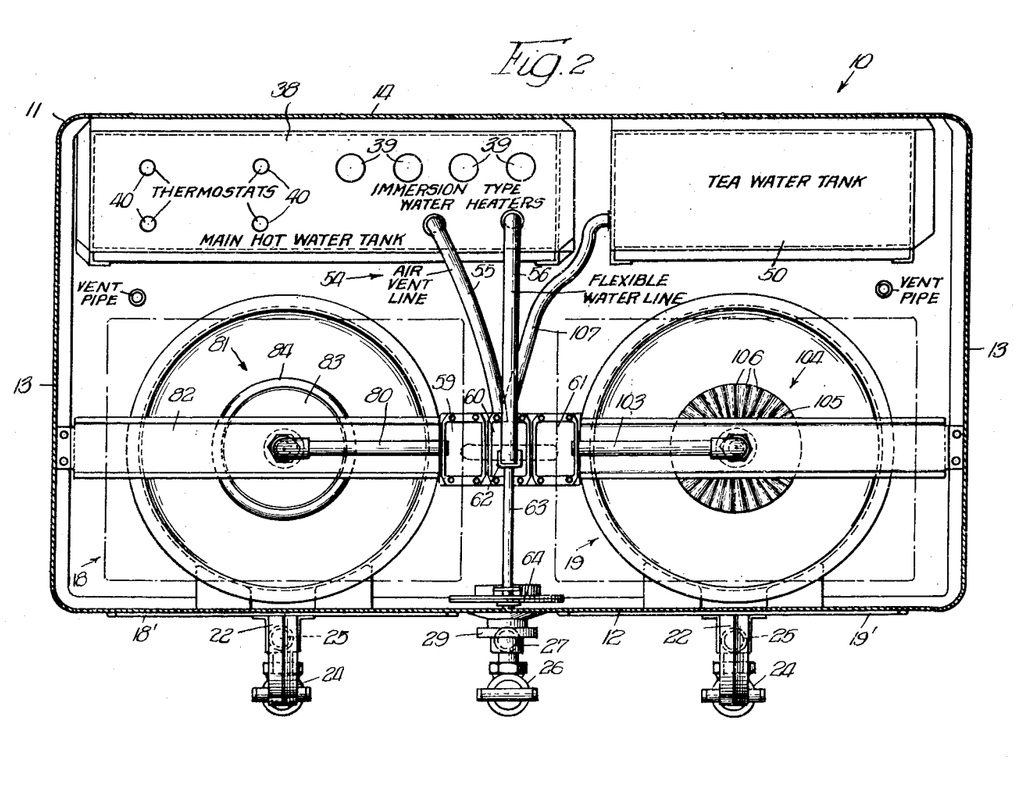
FIG. 2 is a top plan view of the coffee making machine shown in FIG. 1, the top cover having been removed and the walls of the cabinet being shown in section.
Figure 3:
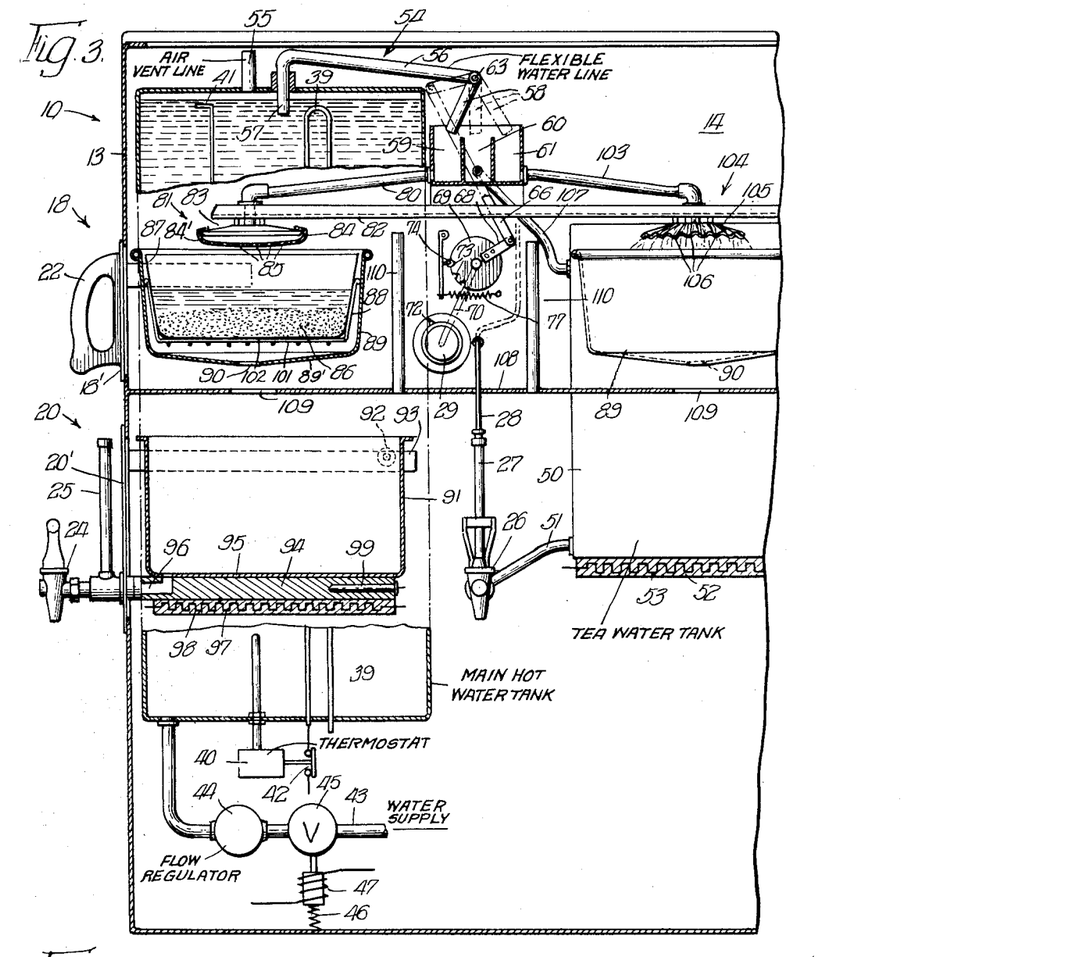
FIG. 3 is a vertical sectional view, somewhat diagrammatic in character, showing certain details of construction of the coffee making machine illustrated in the preceding figures, the upper and lower drawers on the left side being shown as having been rotated through 90° in order to illustrate more clearly the details of construction and to show that the drawers can be arranged to be mounted on opposite sides of the cabinet rather than on the front side.
Figure 5:
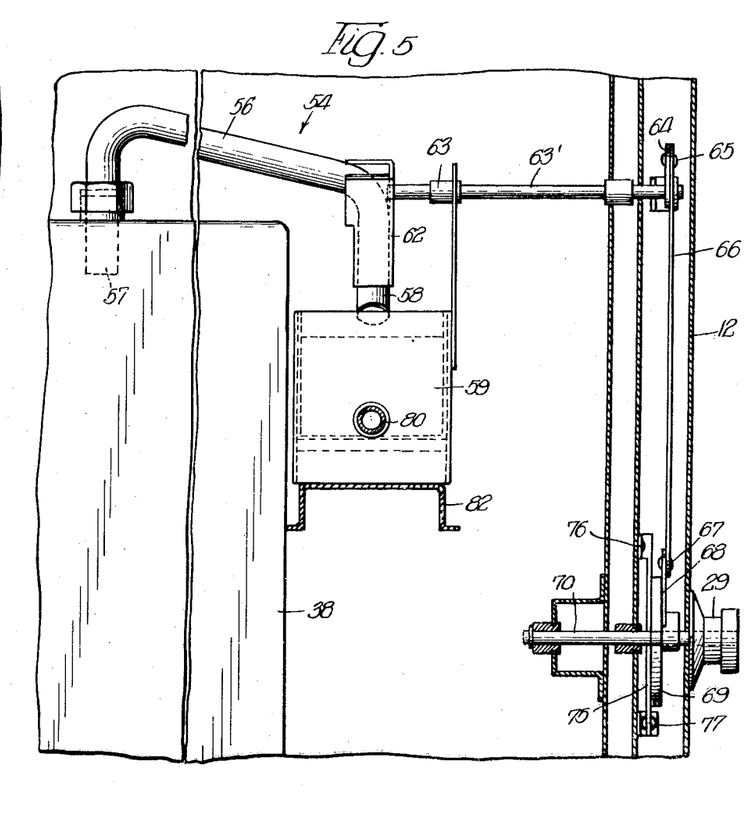
FIG. 5 is a view, looking from left to right, of the mechanism shown in FIG. 4.

Referring now particularly to FIGS. 2, 3 and 5 of the drawings, it will be observed that a main hot water tank 38 is provided inside the cabinet 11 adjacent the back wall 14. Since the main hot water tank 38 has a relatively large capacity, four main water tank heaters of the immersion type are employed. They are indicated at 39 and are shown diagrammatically in FIG. 9. Four thermostats 40 are provided each having a probe 41 associated therewithwith and they are arranged to control the opening and closing of contacts 42 in accordance with the temperature of the water in the main hot water tank 38 in the vicinity of the respective probe 41 for maintaining the temperature of the water at the desired level. Water is supplied to the main hot water tank 38 through a conduit 43 from a suitable water supply under pressure such as from twenty to eighty pounds per square inch. Since it is desirable that the water be supplied to the main hot water tank 38 at a predetermined rate, a flow regulator 44 is inserted in the supply conduit 43. Although the pressure of the water supply may vary over a relatively great range, the flow regulator 44 operates in conventional manner to insure that the rate of flow to the main hot water tank 38 is constant. In order to control the flow of water through the supply conduit 43 a supply valve 45 is employed and, as shown, it is inserted in the supply conduit 43. A spring 46 acts to bias the supply valve 45 to the closed position and a solenoid 47, when energized, serves to open the supply valve 45 against the biasing action of the spring 46.

In order to provide a supply of hot water for making tea, and for other purposes, a tea water tank 50 is mounted within the cabinet 11 as shown in FIG. 2 along the back wall 14 and at one end of the main hot water tank 38. The tea water tank 50 has a capacity which is somewhat in excess of the amount of hot water that is employed for making a batch of coffee extract. With this arrangement the tea water tank 50 can be filled with hot water from the main hot water tank 38 merely by causing the system to operate through a cycle which otherwise would be employed for making a batch of coffee extract. The tea water tank 50 is connected by a conduit 51 to the hot water faucet 26 on the front wall 12 of the cabinet 11. In order to maintain the water in the tea water tank 50 at the desired temperature a contact heater 52 is mounted on its under side and it is provided with a heating element 53 that is arranged to be energized electrically in a manner hereinafter described.

Siphon means, shown generally at 54, are employed as disclosed in George R. Bunn application Serial No. 839,047, filed September 8, 1959 now Patent No. 3,034,-417, issued May 15, 1962, to remove hot water from the main hot water tank 38 for the purposes to be described presently. The siphon means 54 includes an air vent line 55 and a flexible water line 56. The air vent line 55 communicates with the atmosphere at a level above the highest level of the water in the flexible water line 56 in order to provide the siphoning action. It will be observed that the air vent line 55 opens into the extreme top of the main hot water tank 38 while the flexible water line 56 projects, as indicated at 57, into the upper end of the main hot water tank through a limited extent.

Preferably the flexible water line 56 is formed of silicone rubber. The particular silicone rubber employed is white in color having a Durometer of approximately sixty Shore A, a specific gravity of approximately 1.24, a minimum tensile strength of 750 p.s.i. and a minimum elongation of 250%. The material has excellent compression set, is stable at temperatures to 450° F., has low water adsorption, is tasteless, odorless and is non-toxic. An important reason for using silicone rubber for the flexible water line 56 is that it is flexible and also that a minimum of deposition on the inner surface thereof takes place of solid material from the hot water. Any deposition that does occur can be removed readily merely by twisting the flexible water line 56 when it is formed of silicone rubber of the kind and character here specified.

The other end 58 of the flexible water line 56 is arranged, as shown in FIG. 5, to discharge at a level which is below the level of the lowermost part of the end 57 inside of the main hot water tank 38. Provision is made for shifting the other end 58 to discharge into any one of three cups 59, 60 and 61, depending upon the use to which the hot water siphoned from the main hot water tank 38 is to be used.

Figure 4:
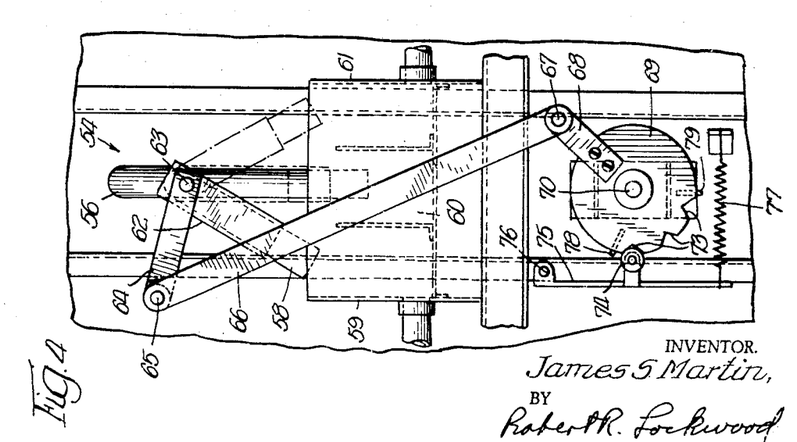
FIG. 4 is a vertical elevational view at an enlarged scale showing certain details of the operating mechanism for the yoke which supports one end of the flexible water line for shifting it from one cup to another.

In order to shift the other end 58 of the flexible water line 56 among the cups 59, 60 and 61 the mechanism shown in FIGS. 4 and 5 can be employed. Here it will be observed that a yoke 62 is secured coextensively with the other end 58 of the flexible water line 56 and that it is pivoted at 63 to a shaft 63' which is suitably rotatably mounted within the cabinet 11. The yoke 62 is secured at one end to the shaft 63' to the other end of which an arm 64 is secured which is pivotally connected at 65 to one end of a link 66. The other end of the link 66 is pivotally connected at 67 to an arm 68 which extends from a circular plate 69 that is mounted for rotation with a shaft 70 which is suitably rotatably mounted within the cabinet 11 and extends through the front wall 12 for receiving the control knob 29 previously referred to. An index 72, FIGS. 1 and 3, is carried by the control knob 29 in order to indicate its position and the corresponding position of the other end 58 of the flexible water line 56. It is desirable to insure that the other end 58 of the flexible water line 56 is properly located to discharge into any one of the cups 59, 60 or 61. For this purpose the circular plate 69, FIG. 4, is provided with three notches 73 in its periphery for receiving in any one of them a roller detent 74 that is carried by an arm 75 which is pivoted at 76 within the cabinet 11. A coil tension spring 77 acts to bias the arm 75 and the roller detent 74 into any one of the notches 73 confronting the same. Stops 78 and 79 limit the angular movement of the circular plate 69 by engaging the roller detent 74 and preventing further rotation in the respective direction.

Referring now particularly to FIGS. 2 and 3 of the drawings, it will be observed that a condit 80 interconnects the lower portion of the cup 59 with a spray head that is indicated, generally, at 81 and is mounted on a support channel 82 which extends between the side walls 13—13 of the cabinet 11 and on which the cups 59, 60 and 61 are mounted in the central portion. The spray head 81 includes a conical disc 83 and overlying it is a spray head 84 that is formed preferably of silicone rubber for the reasons outlined hereinbefore in connection with the description of the flexible water line 56. An annular groove 84' is formed in the spray head 84 into which the periphery of the conical disc 83 extends. Since the spray head 84 is formed of silicone rubber, it is flexible and resilient and is held in place on the disc 83 by its inherent resiliency. The spray head 84 has spray openings 85 to direct the flow of hot water downwardly and outwardly over ground coffee 86 on a paper filter 87 which overlies a wire grill or basket 88 which is formed preferably of stainless steel as described in George R. Bunn application Serial No. 58,775, filed September 27, 1960, now Patent No. 3,034,418, issued May 15, 1962. The wire grill or basket 88 is located within a funnel 89, also formed preferably of stainless steel, having an opening 90 in its conically shaped bottom 89' for the discharge of coffee extract downwardly. The funnel 89 is suitably mounted on the front plate 18' and provision is made (not shown) for slidably mounting the downturned upper edge of the funnel 89 so that it moves together with the front plate 18' into and out of the cabinet 11 on grasping of the handle 22. It will be observed that the funnel 89 forms a part of the left upper drawer 18 and it will be understood that a similar construction is employed for the right upper drawer 19.

The coffee extract flows through the opening 90 in the funnel 89 into a coffee extract receptacle 91 therebelow that is formed preferably of stainless steel and is suitably mounted on the front plate 20' for movement therewith. Sliding movement of the left lower drawer 20, which includes the front plate 20' and the associated coffee extract receptacle 91, is effected by the provision of rollers on opposite sides of the latter one of which is indicated at 92. The rollers 92 are arranged to roll along tracks, one of which is indicated at 93, to facilitate movement of the left lower drawer 20 into and out of the cabinet 11. Suitable means are provided (not shown) for limiting the normal outward movement of the left lower drawer 20 and likewise for the right lower drawer 21 to permit normal cleaning operation to be accomplished.

It is desirable that the coffee extract in the receptacle 91 be supplied with heat in order to maintain the coffee extract at the desired temperature. Also it is desirable that, while sufficient heat is supplied, no hot spots develop likely to cause burning of the coffee extract. With these requirements in mind a heat sink 94 is provided in the form of an aluminum casting which is secured by a layer 95 of epoxy cement to the under side of the bottom of the receptacle 91. The heat sink 94 can be formed of other good conducting metal such as copper and it is arranged to extend over substantially the entire bottom surface of the receptacle 91. A conduit 96 extends from the interior of the receptacle 91 through the heat sink 94 to the coffee extract faucet 24 to permit the withdrawal of the coffee extract. Heat is supplied to the heat sink 94 by a contact heater 97 having a heating element 98 that is energized electrically under the control of a thermostat 99 which is inserted into the body of the heat sink 94. The thermostat 99 is arranged to control the operation of contacts 100, FIG. 9, for maintaining the energization of the heating element 98 as required to maintain the temperature of the coffee extract in the receptacle 91 at the desired level.

With a view to minimizing the distance between the upper drawers 18–19 and the respective lower drawers 20–21, the wire grill or basket 88 in each upper drawer has a flat bottom 101 for receiving a flat bottom 102 of the paper filter 87. The angle of the conically shaped bottom 89' is relatively small as measured from the horizontal but it is sufficient to direct the flow of the coffee extract from the flat bottom 102 of the paper filter 87 to the opening 90 at its apex for discharge into the coffee extract receptacle 91 therebelow. This arrangement permits a closer positioning of the coffee extract receptacle 91 to the funnel 89 than is permitted where the wire grill or basket does not have the flat bottom as described in George R. Bunn application Serial No. 58,775, filed September 27, 1960, now Patent No. 3,034,418, issued May 15, 1962.

Referring now to FIGS. 2 and 3, it will be observed that a conduit 103, corresponding to the conduit 80, serves to interconnect the lower portion of the cup 61 with a spray head that is indicated, generally, at 104 and mounted on the support channel 82. If desired, the spray head 104 can be identical with the spray head 81. Alternatively it can comprise a disc 105 onto which the hot water from the conduit 103 flows. The disc 105 is provided with radial flutes 106 for the purpose of causing the hot water to spray over the ground coffee within the funnel 89 in the manner described for the spray head 81.

Also as shown in FIGS. 2 and 3 the central cup 60 is connected at its bottom by a conduit 107 to the upper portion of the tea water tank 50. When the other end 58 of the flexible water line 56 is arranged to discharge into the central cup 60, hot water is supplied to the tea water tank 50 and its temperature is maintained, in the manner described, by the heating element 53. If desired, the heating element 53 can be thermostatically controlled. As shown particularly in FIG. 2 the air vent line 55, which extends above the flexible water line 56, is arranged to have its open end overlying the center cup 60. While normally there is no discharge through the air vent line 55, in the event that there should be, the water would flow into the central cup 60 and thence to the tea water tank 50.

Extending underneath the funnels 89—89 is a divider plate 108. It is provided with openings 109—109 registering with the openings 90—90 at the bottoms of the funnels 89—89 to permit the coffee extract to discharge downwardly therethrough. Vent pipes 110—110 extend upwardly from the divider plate 108 to provide circulation of the atmosphere between the lower and upper portions of the cabinet 11 thereby preventing condensation of moisture on the outer surfaces of the funnels 89—89.

While FIGS. 1 and 2 of the drawings show the upper drawers 18 and 19 and the lower drawers 20 and 21 as being slidably mounted for movement into and out of the cabinet through the front wall 12, it will be understood that they can be arranged for movement in a similar manner through the side walls 13—13, if such a configuration is desired. FIG. 1A shows a modified coffee making machine 10' with a cabinet 11' having the upper drawers 18 and 19 and the lower drawers 20 and 21 mounted for movement through the side walls 13—13 instead of through the front wall 12. In such case the main hot water tank 38 can be located between the sets of drawers, if such an arrangement is found to be desirable. Also, if desired, only a single upper drawer 18 and a single lower drawer 20 can be used, thereby providing a single rather than a double construction.

Figure 3A:
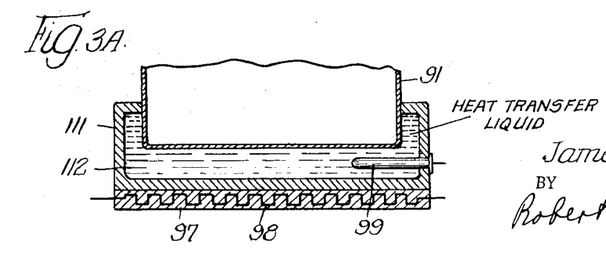
FIG. 3A shows a modified arrangement for heating the coffee extract in the lower drawer.

As shown in FIG. 3A the coffee extract receptacle 91 can be heated by the contact heater 97 as applied to a liquid jacket 111 overlying the bottom and parts of the sides of the receptacle 91. A heat transfer liquid 112, such as propylene glycol, sealed in the jacket 111 serves to uniformly distribute the heat to the coffee extract. The thermostat 99 can be immersed in the liquid 112 to control the energization of the heating element 98 in conventional manner.

Figure 6:
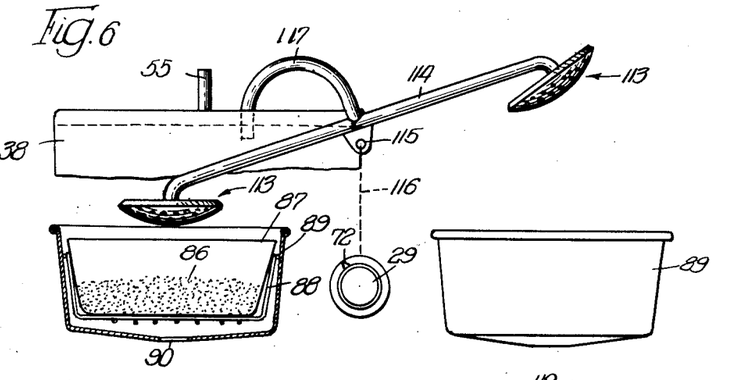
FIGS. 6, 7 and 8 illustrate different arrangements for shifting the connection of the main hot water tank from one to the other of the upper drawers for selectively brewing coffee employing one or the other.

Other means can be provided instead of the cups 59 and 61 for the siphon connection between the main hot water tank 38 and the spray heads associated with the funnels 89—89. As shown in FIG. 6 spray heads 113—113 are provided at the ends of a conduit 114 which is pivoted at 115 and is shown as being mechanically connected by a broken line 116 to the control knob 29. A flexible water line 117, preferably formed of silicone rubber, serves to interconnect a central part of the conduit 114 with the upper end of the main hot water tank 38. In order to direct the flow of hot water from one to the other of the funnels 89—89, the control knob 29 is rotated as before to effect a corresponding rotation of the conduit 114 so as to elevate one or the other of the spray heads 113—113 and lower the other one to discharge hot water over the ground coffee 86.

Figure 7:
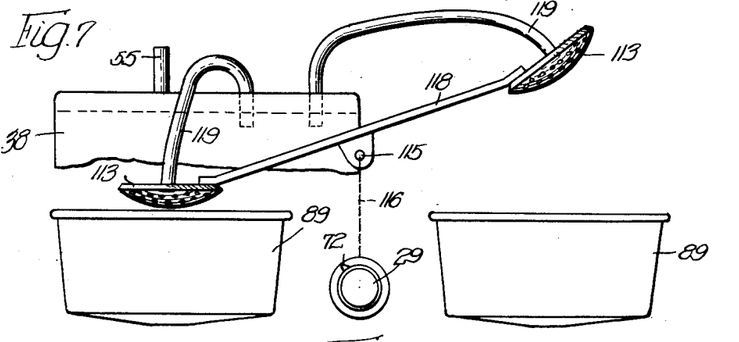

FIG. 7 shows the spray heads 113—113 mechanically interconnected by a rocker bar 118 which is pivoted at 115 and arranged to be operated by the control knob 29 through a mechanical linkage indicated by the broken line 116. In this embodiment flexible water lines 119—119, preferably formed of silicone rubber, individually interconnect the spray heads 113—113 to the upper end of the main hot water tank 38.

Figure 8:
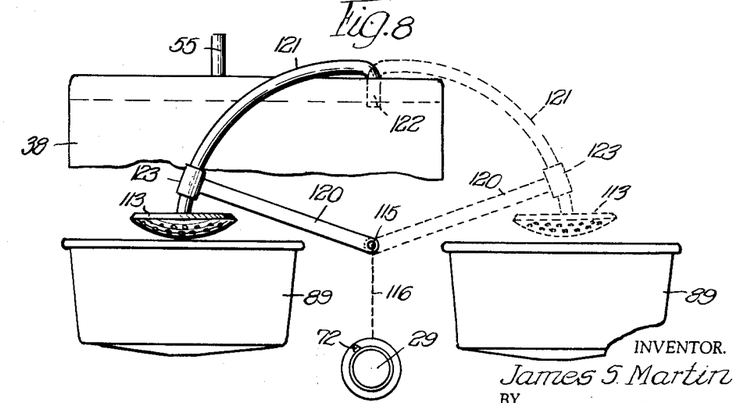

FIG. 8 shows how a single spray head 113 can be employed and provision is made for moving it from registry with one of the funnels 89 to registry with the other one. For this purpose a rocker arm 120 is pivoted at 115 and is arranged to be operated by the control knob 29 through the mechanical linkage indicated by the broken line 116. A flexible water line 121 interconnects the spray head 113 with the upper end of the main hot water tank 38. The flexible water line 121 is swiveled at 122 on the main hot water tank 38 and a sleeve 123 at the outer end of the rocker arm 120 encircles the flexible water line 121 adjacent the spray head 113 to effect transfer from one of the funnels 89 to the other funnel as shown by the broken lines.

Referring now particularly to FIG. 9, it will be observed that the timing circuits for controlling the operation of the coffee making machine 10 are essentially the same as disclosed in George R. Bunn application Serial No. 1,200, filed January 8, 1960. For this purpose a timer, shown generally at 125, is provided. The timer 125 is of conventional construction and it includes a synchronous motor, shown generally at 126, having a field winding 127 and a rotor 128 arranged to drive a shaft 129 and through a one way clutch 130 to drive a shaft 131 through a part of a revolution. The shaft 131, on rotation, tensions a helical spring 132 and at the same time moves an arm 133 away from an adjustable stop 134. Provision is made for adjusting the position of the stop 134 to the end that the arm 133 is rotated from its initial position to its final position at a time of the order of three to ten minutes, the time being variable, as desired, from a few seconds to about ten minutes. The arm 133 at the end of the cycle is arranged to engage an operator 135 which is effective to open normally closed timer contacts 136. In order to relieve the timer contacts 136 of current flow therethrough and interrupting such current flow and also to provide for deenergizing the field winding 127 of the synchronous motor 126 at the end of the timing cycle, a relay shown generally at 137 is provided. The relay 137 includes an operating winding 137w and normally open contacts 137a.

For energizing the electrical system shown in FIG. 9 conductors 138, 139 and 140 are provided which are connected, as indicated, to a three wire single phase source with the conductor 139 preferably being grounded. Such an arrangement provides 115 volts alternating current between the conductors 138 and 139 and between the conductors 139 and 140. Switches 141 and 142 are employed for interconnecting the energized conductors 138 and 140 to distribution conductors 143 and 144 which form a part of the wiring within the cabinet 11. Since the main water tank heaters 39 require substantial current flow, they are divided with two of them being connected between the conductors 143 and 139 and the other two being connected between the conductors 139 and 144. Likewise the left coffee extract drawer heater 98 is connected between conductors 143 and 139 while the right coffee extract drawer heater 98 is connected between the conductors 139 and 144. The tea water tank heater 53 is connected between the conductors 139 and 140 while the timer 125 and parts associated therewith are connected between the conductors 143 and 139.

In describing the operation of the coffee making machine 10, it will be assumed that the main hot water tank 38 has been filled, that the tea water tank 50 has been filled and that the switches 141 and 142 have been closed. Under these conditions the main water tank heaters 39 function to maintain the temperature of the water in the main hot water tank 38 at the desired temperature and the tea water tank heater 53 accomplishes the same function for the water in the tea water tank 50.

Assuming that it is desired to make a batch of coffee extract in the left side of the cabinet 11, the left upper drawer 18 is withdrawn, a paper filter 87 is positioned on the wire grill or basket 88 and a measured amount of ground coffee 86 is placed on the paper filter 87. Then the left upper drawer 18 is reinserted in the cabinet 11. The control knob 29 is adjusted to the position shown in FIG. 3 where the other end 58 of the flexible water line 56 is arranged to discharge into the left cup 59.

The on-off switch 31 for the left coffee extract drawer heater 98 is operated to the energized position and the heater 98 is energized under the control of the thermostat 99 which controls the operation of contacts 100. Also the on-off switch 33 is operated to the closed position in which the indicating lamp 34 is energized over an obvious circuit. Next the start switch 35 is momentarily depressed and a circuit is completed through its contacts from conductor 143 to energize operating winding 137w of the relay 137, the circuit being completed to the conductor 139. On closure of contacts 137a a holding circuit is completed and it is no longer necessary to maintain the start switch 35 depressed. As a result of the closure of the contacts of the start switch 35 and the maintenance of this circuit by the closure of contacts 137a the solenoid 47 is energized and the supply valve 45 is opened. Cold water then flows through the supply conduit 43 under the control of the flow regulator 44 into the main hot water tank 38. Due to the siphon action of the siphon means 54 after the flexible water line 56 has been filled to the top of the section 57 projecting into the upper end of the hot water tank 38, hot water flows from the upper end of the main hot water tank 38 through the flexible water line 56 into the left cup 59 whence it flows through conduit 80 to the spray head 81 where it is distributed over the ground coffee 86 on the paper filter 87 in the wire grill or basket 88. The coffee extract flows from the opening 90 at the bottom of the funnel 89 into the coffee extract receptacle 91 therebelow.

Concurrently with the energization of the winding 137w and the solenoid 47 the field winding 127 of the synchronous motor 126 is energized and it begins to rotate the shaft 129 and thereby through the one way clutch 130 to rotate the shaft 131 and wind up the helical spring 132. In addition the arm 133 moves away from the stop 134 until it engages the operator 135 whereupon timer contacts 136 are opened. The energizing circuits for the winding 137w and the solenoid 47 are opened, contacts 137a are opened and solenoid 47 is deenergized. The time required for the movement of the arm 133 to open contacts 136 is adjusted to permit the valve 45 to remain open long enough to cause the required amount of hot water to be sprayed over the ground coffee 86 and to fill the coffee extract receptacle 91 to a corresponding level. Since this time can be controlled with a high degree of accuracy and since the flow regulator 44 insures that the flow of water to the main hot water tank 38 is at a predetermined rate, it is possible to carefully correlate the amount of ground coffee 86 and the amount of hot water that is siphoned out of the main hot water tank 38 and is sprayed over the ground coffee 86.

After the coffee making cycle has been completed for the left upper and lower drawers 18 and 20, the same cycle can be repeated for the right upper and lower drawers 19 and 21. This is accomplished by rotating the knob 29 to position the other end 58 of the flexible water line 46 so that it discharges into the right cup 61. Then the control cycle is repeated.

Hot water can be withdrawn from the tea water tank 50 by opening the hot water faucet 26. When the level of the water in the tea water tank 50 falls below a predetermined level as viewed in the sight glass 27, an additional amount of hot water should be supplied to the tea water tank 50. For this purpose the control knob 29 is rotated to the central position where the other end 58 of the flexible water line 56 discharges into the center cup 60. Then a cycle is initiated, similar to the coffee extract making cycle, in the manner previously described and the same amount of hot water is supplied to the tea water tank 50 that is supplied for the coffee extract making cycle. After this amount of hot water has been supplied to the tea water tank 50, the timer 125, in the manner described, functions to effect the closure of the supply valve 45.

Since certain changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. Beverage making apparatus comprising:
   (a) a cabinet,
   (b) upper and lower drawers mounted on said cabinet,
   (c) said upper drawer including a funnel and a grill carrying a filter and discharging into said lower drawer,
(d) a brewing liquid tank,
(e) a supply valve,
(f) means for connecting said tank through said supply valve to a source of brewing liquid under pressure,
(g) means for heating brewing liquid in said tank,
(h) a discharge head overlying said filter for distributing hot brewing liquid thereover,
(i) siphon means interconnecting said tank and said discharge head including
    (1) a discharge brewing liquid line for the flow of hot brewing liquid to said discharge head, and
    (2) an air vent line extending above said discharge line, through which brewing liquid does not normally flow while brewing liquid flows through said discharge line and in which the brewing liquid level under normal operating conditions is the same as the highest level of brewing liquid in said discharge line,
(j) means for opening said supply valve to cause a predetermined quantity of brewing liquid to flow from said tank to said discharge head, and
(k) means for withdrawing the liquid from said lower drawer.

2. Beverage making apparatus comprising:
(a) a cabinet,
(b) a pair of upper drawers and a pair of lower drawers below said upper drawers respectively and all said drawers being mounted on said cabinet,
(c) each upper drawer including a funnel and a grill carrying a filter and discharging into the lower drawer therebelow,
(d) a brewing liquid tank,
(e) a supply valve,
(f) means for connecting said tank through said supply valve to a source of brewing liquid under pressure,
(g) means for heating brewing liquid in said tank,
(h) a discharge head overlying said filter in each upper drawer for distributing hot brewing liquid thereover to cause said liquid to flow into the respective lower drawer,
(i) siphon means for selectively supplying hot brewing liquid from said brewing liquid tank to either of said discharge heads including:
    (1) a discharge brewing liquid line for the flow of hot brewing liquid to one or the other of said discharge heads, and
    (2) an air vent line extending above said discharge line, through which brewing liquid does not normally flow while brewing liquid flows through said discharge line and in which the brewing liquid level under normal operating conditions is the same as the highest level of brewing liquid in said discharge line,
(j) means for opening said supply valve to cause a predetermined quantity of brewing liquid to flow from said tank to the selected discharge head, and
(k) means for withdrawing the liquid from each lower drawer.

3. Beverage making apparatus comprising:
(a) a cabinet,
(b) a pair of upper drawers and a pair of lower drawers below said upper drawers respectively and all said drawers being mounted on and movable horizontally into and out of said cabinet,
(c) each upper drawer including a funnel for receiving a grill carrying a filter and discharging the lower drawer therebelow,
(d) a brewing liquid tank,
(e) a supply valve,
(f) means for connecting said tank through said supply valve to a source of brewing liquid under pressure,
(g) means for heating brewing liquid in said tank,
(h) a discharge head overlying the filter in each upper drawer for distributing hot brewing liquid thereover to cause said liquid to flow into the respective lower drawer,
(i) a cup individual to each discharge head, connected thereto, open to the atmosphere and located below the top of said tank and above the respective discharge head,
(j) a discharge brewing liquid line providing a connection between said tank and said cups,
(k) means for shifting the connection of said brewing liquid line from one cup to the other for selectively supplying hot brewing liquid to one or the other of said discharge heads,
(l) means for opening said supply valve to cause a predetermined quantity of hot brewing liquid to flow from said tank to the selected discharge head, and
(m) means for withdrawing the liquid from each lower drawer.

4. The invention, as set forth in claim 3, wherein the connection shifting means for the brewing liquid line includes:
(a) a manually rotatable knob on the cabinet,
(b) link means interconnecting said knob and said brewing liquid line to move at least a portion of it by rotation of said knob from one position to another position, and
(c) index means cooperating with said knob to hold it in the respective position.

5. The invention, as set forth in claim 3, wherein:
(a) an auxiliary brewing liquid tank is mounted in the cabinet,
(b) means are provided for heating the liquid in said auxiliary tank,
(c) a cup individual to said auxiliary tank is provided at the same level as the cups individual to the discharge heads and is connected to said auxiliary tank,
(d) the discharge brewing liquid line is shiftable to said cup individual to said auxiliary tank to supply brewing liquid thereto, and
(e) means are provided for withdrawing hot brewing liquid from said auxiliary water tank.

6. Beverage making apparatus comprising:
(a) a pair of funnels each having a grill therein carrying a beverage brewing material receiving filter and discharging into a beverage receiving container therebelow,
(b) means mounting said funnels at substantially the same elevation,
(c) a brewing liquid tank,
(d) a supply valve,
(e) means for connecting said tank through said supply valve to a source of brewing liquid under pressure,
(f) means for heating brewing liquid in said tank,
(g) discharge head means for overlying said funnels,
(h) means for selectively supplying hot brewing liquid from said tank to said funnels including:
    (1) flexible conduit means connected at one end to said tank and at the other end to said discharge head means, and
    (2) means for flexing the other end of said flexible conduit means, and
(i) means for opening said supply valve to cause hot brewing liquid to flow from said tank to the selected funnel and the beverage to flow therefrom to the container individual thereto.

7. The invention, as set forth in claim 6, wherein:
(a) the discharge head means comprise a discharge head individual to each funnel,
(b) a support carries a discharge head at each end, and (c) means mount said support intermediate its ends for rotation about a horizontal axis whereby, when brewing liquid is being discharged from one head, the other head is elevated and no brewing liquid is discharged therefrom.

8. The invention, as set forth in claim 7, wherein:
(a) a conduit interconnects the discharge heads, and
(b) the flexible conduit means interconnects said conduit and the tank.

9. The invention, as set forth in claim 7, wherein the flexible conduit means comprises a flexible conduit individual to each discharge head directly connecting the same to the tank.

10. The invention, as set forth in claim 6, wherein:
(a) the discharge head means comprises a single discharge head, and
(b) the means for selecting one or the other of the funnels to receive hot brewing liquid comprises means for shifting said single discharge head from one funnel to the other.

11. Means for holding beverage brewing material for use in a beverage making machine comprising:
(a) a filter comprising a sheet of filter paper open at the top and having a horizontal flat bottom and upstanding sides for receiving the beverage brewing material,
(b) a wire grill having a horizontal flat bottom and upstanding sides supporting said filter, and
(c) a funnel telescoped with said wire grill and having and aperture conical bottom underlying said flat bottom of said wire grill.

12. The invention, as set forth in claim 11, wherein the angle of the conical bottom away from the horizontal is relatively small whereby its upper surface is in close proximity to the flat bottom of the wire grill throughout substantially the entire extent thereof.

13. Beverage making apparatus comprising:
(a) a cabinet,
(b) first and second beverage receiving containers mounted in said cabinet,
(c) a funnel mounted in said cabinet above each container for receiving a grill carrying a filter and discharging into the respective container,
(d) a brewing liquid tank,
(e) means for connecting said tank to a source of brewing liquid,
(f) means for heating brewing liquid in said tank,
(g) a cup individual to each funnel and open to the atmosphere and located below the top of said tank,
(h) a discharge brewing liquid line providing a connection between said tank and one of said cups to supply hot brewing liquid thereto,
(i) a discharge head overlying each filter and connected to the cup individual thereto for distributing hot brewing liquid thereover to flow into the respective container,
(j) means for causing a quantity of brewing liquid to flow from said tank through said discharge brewing liquid line and one of said cups to the respective discharge head,
(k) means for shifting the connection of said brewing liquid line from one cup to the other cup for selectively supplying hot brewing liquid to one or the other of the discharge heads, and
(l) means for withdrawing the liquid from each container.

14. The invention, as set forth in claim 13, wherein the connection shifting means for the brewing liquid line includes:
(a) a manually rotatable knob on the cabinet,
(b) link means interconnecting said knob and said brewing liquid line to move at least a portion of it by rotation of said knob from one position to another position, and
(c) index means cooperating with said knob to hold it in the respective position.

15. The invention, as set forth in claim 13, wherein:
(a) an auxiliary brewing liquid tank is mounted in the cabinet,
(b) means are provided for heating the liquid in said auxiliary tank,
(c) a cup individual to said auxiliary tank is provided at the same level as the cups individual to the discharge heads and is connected to said auxiliary tank,
(d) the discharge brewing liquid line is shiftable to said cup individual to said auxiliary tank to supply brewing liquid thereto, and
(e) means are provided for withdrawing hot brewing liquid from said auxiliary water tank.

References Cited in the file of this patent

UNITED STATES PATENTS

| | | |
|---|---|---|
| 598,391 | Pooler | Feb. 1, 1898 |
| 1,551,855 | Svendsgaard | Sept. 1, 1925 |
| 1,609,047 | Beale | Nov. 30, 1926 |
| 2,253,600 | Arneson | Aug. 26, 1941 |
| 2,402,741 | Draviner | June 25, 1946 |
| 2,568,840 | Zees | Sept. 25, 1951 |
| 2,652,283 | Roop | Sept. 15, 1953 |
| 2,706,444 | Chaplik | Apr. 19, 1955 |
| 2,874,630 | Valente | Feb. 24, 1959 |
| 2,935,010 | Arnett | May 3, 1960 |
| 2,955,527 | Collins | Oct. 11, 1960 |
| 3,008,650 | Prokop | Nov. 14, 1961 |
| 3,030,874 | Fiori | Apr. 24, 1962 |
| 3,034,417 | Bunn | May 15, 1962 |

FOREIGN PATENTS

| | | |
|---|---|---|
| 314,618 | Italy | Feb. 1, 1934 |
| 532,390 | France | Nov. 14, 1921 |
| 702,633 | France | Jan. 26, 1931 |

OTHER REFERENCES

Publication: "Silicones" (Reinhold Plastics Application Series), page 156 (received by Scientific Library Feb. 23, 1960).

UNITED STATES PATENT OFFICE
CERTIFICATE OF CORRECTION

Patent No. 3,149,556                      September 22, 1964

James S. Martin

It is hereby certified that error appears in the above numbered patent requiring correction and that the said Letters Patent should read as corrected below.

Column 4, line 29, for "69" read -- 59 --; line 40, for "condit" read -- conduit --; column 9, line 70, after "discharging" insert -- into --; column 11, line 30, for "and aperature" read -- an aperatured --.

Signed and sealed this 19th day of January 1965.

(SEAL)
Attest:

ERNEST W. SWIDER                      EDWARD J. BRENNER
Attesting Officer                      Commissioner of Patents